(12) United States Patent
Kattainen et al.

(10) Patent No.: US 10,196,234 B2
(45) Date of Patent: Feb. 5, 2019

(54) METHOD FOR CONTROLLING UNINTENDED VERTICAL SPEED AND ACCELERATION OF AN ELEVATOR

(71) Applicant: KONE Corporation, Helsinki (FI)

(72) Inventors: Ari Kattainen, Hyvinkää (FI); Lauri Stolt, Helsinki (FI)

(73) Assignee: KONE CORPORATION, Helsinki (FI)

( * ) Notice: Subject to any disclaimer, the term of this patent is extended or adjusted under 35 U.S.C. 154(b) by 435 days.

(21) Appl. No.: 15/009,554

(22) Filed: Jan. 28, 2016

(65) Prior Publication Data

US 2016/0145074 A1    May 26, 2016

Related U.S. Application Data

(63) Continuation of application No. PCT/EP2014/067087, filed on Aug. 8, 2014.

(30) Foreign Application Priority Data

Aug. 8, 2013   (EP) .................................... 13179724

(51) Int. Cl.
*B66B 1/28*       (2006.01)
*B66B 5/02*       (2006.01)
(Continued)

(52) U.S. Cl.
CPC .............. *B66B 1/285* (2013.01); *B66B 5/022* (2013.01); *B66B 5/025* (2013.01); *B66B 9/00* (2013.01); *G05B 15/02* (2013.01)

(58) Field of Classification Search
CPC ......... B66B 1/285; B66B 5/022; B66B 5/025; B66B 9/00; G05B 15/02
(Continued)

(56) References Cited

U.S. PATENT DOCUMENTS 5,637,841 A * 6/1997 Dugan ..................... B66B 1/30
                                                        187/291
6,173,813 B1   1/2001 Rebillard et al.
(Continued)

FOREIGN PATENT DOCUMENTS

CN        1331653 A      1/2002
CN      101391718 A      3/2009
(Continued)

*Primary Examiner* — Anthony Salata
(74) *Attorney, Agent, or Firm* — Birch, Stewart, Kolasch & Birch, LLP (57) ABSTRACT

A method for controlling an elevator includes controlling the speed of a vertically moving elevator car during its run from a starting landing to a destination landing according to speed settings, the speed settings defining a constant target speed for the elevator car. The method includes obtaining measurement data of the ongoing run, which measurement data describes vertical speed and/or vertical acceleration of the vertically moving elevator car, determining whether the measurement data meets one or more predetermined criteria indicating unintended vertical speed and/or unintended vertical acceleration, and changing the speed settings of the current run by lowering the constant target speed from a first constant target speed to a second constant target speed if the measurement data meets said one or more predetermined criteria, continuing the run without intermediate stops to said destination landing. An elevator is provided to implement the method.

13 Claims, 2 Drawing Sheets

Legend
1 - elevator car
2 - starting landing
3 - destination landing
4 - roping
5 - motor
6 - rotatable member
7 - control unit
11 - overspeed governor
CW - counterweight
i - input for measurement signal s
M - machinery
S - hoistway
s - measurement signal (51) Int. Cl.
*B66B 9/00* (2006.01)
*G05B 15/02* (2006.01)

(58) Field of Classification Search
USPC ....... 187/247, 289, 290, 293, 295, 296, 297,
187/391–393; 318/59, 66, 98; 388/904
See application file for complete search history.

(56) References Cited

U.S. PATENT DOCUMENTS

| | | | |
|---|---|---|---|
| 7,575,100 B2* | 8/2009 | Kugiya | B66B 5/06 187/293 |
| 8,439,168 B2* | 5/2013 | Kondo | B66B 1/285 187/288 |
| 8,490,753 B2* | 7/2013 | Yamamoto | B66B 1/30 187/295 |
| 8,584,808 B2* | 11/2013 | Malrait | B66B 1/285 187/295 |
| 8,789,660 B2* | 7/2014 | Tenhunen | B66B 1/304 187/295 |
| 9,022,178 B2* | 5/2015 | Foschini | B66B 1/302 187/293 |
| 2012/0111670 A1* | 5/2012 | Fargo | B66B 1/302 187/247 |

FOREIGN PATENT DOCUMENTS

| | | |
|---|---|---|
| EP | 0628510 B1 | 3/1999 |
| EP | 0662445 B1 | 4/1999 |
| JP | 9-67071 A | 3/1997 |
| JP | 10-316319 A | 12/1998 |
| SU | 623803 A1 | 8/1978 |

\* cited by examiner

Legend
5 - motor
7 - control unit
i - input for measurement signal s
m - memory
o - output
p - processing means
p2 - second processing means
s - measurement signal

METHOD FOR CONTROLLING UNINTENDED VERTICAL SPEED AND ACCELERATION OF AN ELEVATOR

CROSS REFERENCE TO RELATED APPLICATIONS:

This application is a Continuation of PCT International Application No. PCT/EP2014/067087, filed on Aug. 8, 2014, which claims priority under 35 U.S.C. 119(a) to Patent Application No. 13179724.3, filed in Europe on Aug. 8, 2013, all of which are hereby expressly incorporated by reference into the present application.

FIELD OF THE INVENTION

The invention relates to controlling an elevator, which is meant for transporting passengers and/or goods.

BACKGROUND OF THE INVENTION

Modern elevators usually have a machinery, which drives the elevator car under control of a control unit. The control unit is typically a centralized set of electrical components but may also be in a decentralized form such that the functions are performed with distantly positioned electrical components. The machinery typically comprises a motor connected in a force transmitting manner with a traction sheave engaging an elevator roping connected to the car. Thus, the driving force can be transmitted first from the motor to the drive sheave, and from the drive sheave to the elevator car via said roping. The elevator control unit typically controls the speed of the elevator car by controlling the rotational speed of the motor of the machinery according to speed settings stored in a memory of the control unit. The speed settings define the target speed for the elevator car. The control unit controls the speed of the car so that it follows the target speed as far as possible. The speed settings typically define a constant target speed for the ongoing elevator run, i.e. a speed which stays unchanged a substantial period of time. This constant target speed is usually the maximum speed the car reaches during its run, and its length and value is typically maximized so as to provided quick transportation from a starting landing to a destination landing. In a normal run, a cycle comprising an acceleration phase from standstill, a deceleration phase to standstill, and a constant speed phase occurring between the acceleration phase and the deceleration phase is carried out. In the acceleration phase the elevator car is first accelerated from standstill to the constant target speed and in the constant speed phase the car speed is maintained constant as far as possible until the car needs to decelerate so as to smoothly arrive at the destination landing.

The speed of the elevator car needs to be prevented from exceeding a certain safety limit. Thus, in threatening situations the car can be stopped before the speed thereof increases further to a hazardous scale. Such problems may arise for example if the roping slips or the roping is cut. A safety limit of this kind is overseen by an arrangement for preventing overspeed of the car. This arrangement may be in the form of a device called overspeed governor, for instance. The elevator car is typically brought to an immediate stop if the safety limit is exceeded. This kind of safety limit is normally used to trigger an immediate, but controlled emergency stopping sequence. Additionally, a safety gear braking is triggered if the speed increases despite the emergency stopping sequence. The problem with the known elevators has been that some abnormal conditions may cause the elevator car to oscillate vertically such that at the moment of the peak of the oscillation one of these safety limits is momentarily exceeded. This problem is most likely to occur during the constant speed phase when the car speed is high. Such abnormal situations has been now noticed to include at least an earthquake, sway of the ship in case the elevator is installed in a ship, people jumping inside the car, momentarily increased resistance in sliding against the guide rails and irregular feed-back from a broken motor speed regulation sensor. These kind of abnormal situations have been noticed to cause unscheduled stops for the car, in particular due to triggering of said emergency stopping sequence or in the worst case even a safety gear braking. The unscheduled stops have the disadvantage that they decrease the efficiency and reliability of the system as well as cause inconvenience for the passengers at least for the reason that the destination landing is not reached.

BRIEF DESCRIPTION OF THE INVENTION

The object of the invention is, inter alia, to solve previously described drawbacks of known solutions and problems discussed later in the description of the invention. An object of the invention is to introduce a new method as well as an elevator with improved efficiency, reliability and convenience in such abnormal conditions, which cause unintended variations in car speed.

Embodiments are presented, inter alia, where these abnormal conditions are reacted to, but in a manner which minimizes the need for unscheduled stops.

It is brought forward a new method for controlling an elevator, the method comprising controlling the speed of a vertically moving elevator car during its run from a starting landing to a destination landing according to speed settings, the speed settings defining a constant target speed for the elevator car. The method comprises obtaining measurement data of the ongoing run, which measurement data describes at least vertical speed of the vertically moving elevator car, determining whether the measurement data meets one or more predetermined criteria indicating unintended vertical speed, said one or more predetermined criteria comprising at least that the deviation between the vertical speed of the car (1) and a speed of the motor (5) exceeds a predetermined limit, changing the speed settings of the current run by lowering the constant target speed from a first constant target speed to a second constant target speed if the measurement data meets said one or more predetermined criteria, and continuing the run without intermediate stops to said destination landing.

Hereby, the number of unscheduled stops can be effectively reduced.

In a preferred embodiment if the measurement data meets said one or more predetermined criteria, the speed settings of the current run are changed by lowering the constant target speed 5-30%, preferably 10-25%. Thereby, the speed of the car is lowered at a level from which a most meaningful portion of uncritical excitations is unable to cause a momentary peak in speed in such a way that a safety limit is momentarily exceeded.

In a preferred embodiment the original destination landing of the run is maintained the same despite said changing of the speed settings.

In a preferred embodiment the first constant target speed is the nominal speed of the elevator or at least not less than 75% of the nominal speed.

In a preferred embodiment at least said changing is omitted if the constant target speed is lower than a predetermined speed, said predetermined speed being preferably the nominal speed of the elevator or a speed not less than 75% of the nominal speed. Thereby, said changing of speed aiming to reduce unnecessary unscheduled stops can be avoided in situations where such changing is likely to be unnecessary.

In a preferred embodiment said one or more predetermined criteria comprises one or more of the following criteria
- the vertical speed of the car as described by the measurement data, exceeds a predetermined limit while the car speed is being controlled according to a constant target speed, i.e. during a constant speed phase; and
- the vertical speed of the car as described by the measurement data alternates, while the car speed is being controlled according to a constant target speed, i.e. during a constant speed phase.

In a preferred embodiment said measurement data obtained describes also vertical acceleration of the vertically moving elevator car, and in said determining it is also determined whether the measurement data meets one or more predetermined criteria indicating unintended vertical acceleration. Then, preferably said one or more predetermined criteria further comprises one or more of the following criteria
- the vertical acceleration of the car as described by the measurement data exceeds a predetermined limit while the car speed is being controlled according to a constant target speed; and
- the vertical acceleration of the car alternates, while the car speed is being controlled according to a constant target speed.

In a preferred embodiment said obtaining comprises generating measurement data describing vertical speed and preferably also vertical acceleration of the vertically moving elevator car.

In a preferred embodiment said generating comprises measuring vertical speed and/or vertical acceleration of the vertically moving elevator car.

In a preferred embodiment said generating measurement data describing vertical speed and preferably also vertical acceleration of the vertically moving elevator car comprises measuring vertical acceleration of the vertically moving elevator car with an acceleration sensor mounted on the elevator car. Thus, the measurement is direct, whereby reliable, quick and accurate measurements can be collected. Also, the measuring device can in this way be designed to be simple.

In a preferred embodiment said measurement data describes vertical speed of the currently vertically moving elevator car, and said generating measurement data describing vertical speed comprises measuring vertical acceleration of the currently vertically moving elevator car and integrating said measured vertical acceleration.

In a preferred embodiment, for providing a high level of safety, the elevator is provided with one or more safety limits for the car speed, exceeding of which is arranged to cause unscheduled stopping of the car, such as for example immediate braking by car brakes or by machine brakes. Thereby, the elevator is safe yet the method effectively reduces number of unnecessary triggering of this safety function.

In a preferred embodiment said controlling the speed of an elevator car a vertically moving elevator car during its run from a starting landing to a destination landing according to speed settings comprises controlling rotational speed of an electric motor according to said speed settings.

In a preferred embodiment said determining comprises comparing the measurement data describing vertical speed of the vertically moving elevator car with data, such as measurement data, describing speed of the motor. The method preferably further comprises obtaining said measurement data describing speed of the motor. Said speed may be rpm or circumferential speed of the motor for example.

In a preferred embodiment the method comprises a step wherein one or both of said motor speed, in particular data describing speed of the motor, and the measurement data describing the vertical speed of the vertically moving elevator car is/are further processed for making them comparable. This processing can be carried out by processor(s) comprised in the control unit of the elevator.

It is also brought forward a new elevator comprising an elevator car, a roping suspending the elevator car, a machinery comprising a motor connected to a rotatable drive member engaging the roping, a control unit for controlling the speed of the elevator car by controlling the rotational speed of the motor of the machinery, the control unit being configured to control the speed of the vertically moving elevator car during its run from a first landing to a second landing according to speed settings, the speed settings defining a constant target speed for the elevator car. The control unit is configured to obtain measurement data of the ongoing run, which measurement data describes vertical speed of the vertically moving elevator car, and to determine whether the measurement data meets one or more predetermined criteria indicating unintended vertical speed, said one or more predetermined criteria comprising at least that the deviation between the vertical speed of the car and a speed of the motor exceeds a predetermined limit, and if the measurement data meets said one or more predetermined criteria, to change the speed settings of the current run by lowering the constant target speed. The elevator is further configured to continue the run without intermediate stops to said destination landing. The elevator is preferably further configured to carry out any of the above described method steps, and thereby to solve the corresponding drawbacks as above described.

In a preferred embodiment, the elevator comprises a measuring device for measuring the vertical speed and/or vertical acceleration of the vertically moving elevator car.

In a preferred embodiment, the measuring device comprises at least one acceleration sensor mounted on the elevator car.

In a preferred embodiment the control unit comprises an input for a measurement signal from a measuring device measuring the vertical speed and/or vertical acceleration of the vertically moving elevator car.

In a preferred embodiment the control unit comprises a memory storing said criteria.

In a preferred embodiment the control unit comprises a processing means, such as one or more microprocessors, in data transfer connection with the memory and said input, configured to perform the aforementioned determining and changing of the speed settings.

In a preferred embodiment the elevator is additionally provided with an arrangement defining one or more safety limits for the speed of the car, exceeding of which one or more limits is configured to cause unscheduled stopping of the car.

In a preferred embodiment said one or more safety limits comprise at least a safety limit which is constant for the whole run. This safety limit may be for instance that provided by an overspeed governor (OSG).

The elevator as described anywhere above is preferably, but not necessarily, installed inside a building. It is of the type where the car is arranged to serve two or more landings. The car preferably responds to calls from landing and/or destination commands from inside the car so as to serve persons on the landing(s) and/or inside the elevator car. Preferably, the car has an interior space suitable for receiving a passenger or passengers, and the car can be provided with a door for forming a closed interior space. Thereby, it is well suitable for serving passengers.

BRIEF DESCRIPTION OF THE DRAWINGS

In the following, the present invention will be described in more detail by way of example and with reference to the attached drawings, in which.

DETAILED DESCRIPTION

Figure 1:
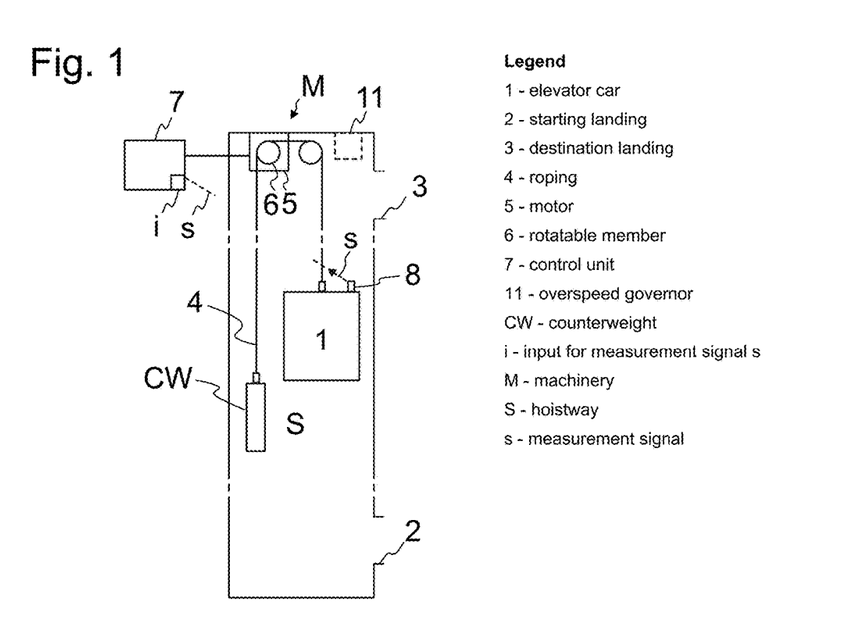
FIG. 1 illustrates schematically an elevator according to a preferred embodiment of the invention implementing a method according to a preferred embodiment of the invention.

FIG. 1 illustrates an elevator implementing a method for controlling an elevator. The elevator comprises a hoistway S, an elevator car 1 and a counterweight CW vertically movable in the hoistway S, and a machinery M which drives the elevator car 1 under control of a control unit 7. The machinery M comprises a motor 5 connected in force transmitting manner with a member 6 rotatable with the motor, which rotatable member 6 is in this embodiment a traction sheave 6. The rotatable member 6 engages a roping 4 passing around the rotatable member 6, with friction engagement and/or with a positive engagement. The roping 4 is connected to the car 1, so the driving force needed for moving the car can be transmitted from the motor to the rotatable member 6 and from the rotatable member 6 to the elevator car 1 via the roping 4. The roping 4 comprises one or several ropes of any suitable type, for example ropes of substantially round cross-section or belt-like ropes, and connects the elevator car 1 and the counterweight 2 to each other.

Figure 2:
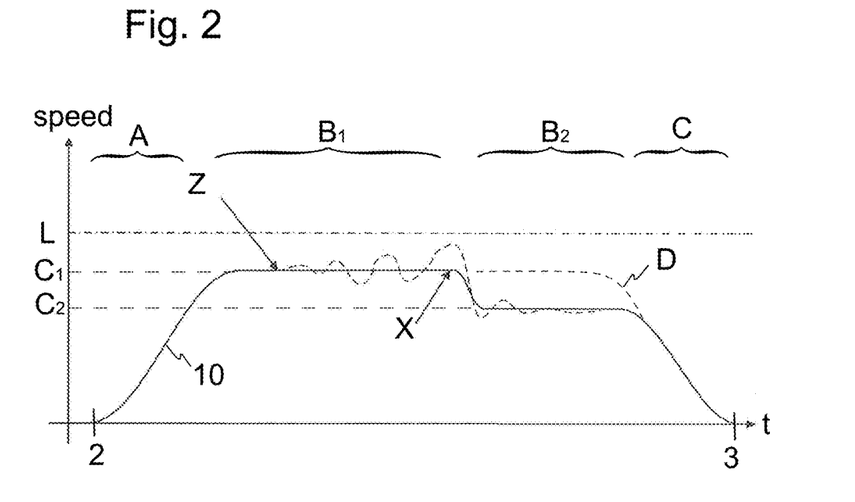
FIG. 2 illustrates the target speed of the elevator car for a single run relative to time expressed as a curve, as well as the measured speed of the car relative to time expressed as a curve, in case of a run during which unintended vertical speed and unintended vertical acceleration takes place.

The elevator is designed to travel without intermediate stoppings from a starting landing 2 to a destination landing 3. The run from the starting landing 2 to the destination landing 3 comprises a cycle with an acceleration phase A from standstill, a deceleration phase C to standstill, and a constant speed phase $B_1$, $B_2$ occurring between the acceleration phase A and the deceleration phase C is carried out. These phases are illustrated in FIG. 2, which presents the speed of the car relative to time. During a normal run only one constant speed phase is carried out during the run. However, the run as illustrated in FIG. 2 contains two constant speed phases $B_1$ and $B_2$, a constant speed phase with a first constant target speed $C_1$ and a subsequent constant speed phase with a second and lower (nonzero) constant target speed $C_2$ respectively. In this run a speed setting change is performed because unintended vertical acceleration and speed are detected to occur during the run. Dashed line D illustrates what the target speed curve would have been in case of a normal run, i.e. a run without the speed setting change.

During the run, in the acceleration phase A the elevator car 1 is first accelerated from a standstill state to the constant target speed and in the constant speed phases $B_1$, $B_2$ the car speed is maintained constant as far as possible. In the later deceleration phase C the car is decelerated so that it smoothly arrives at the destination landing 3. These phases are controlled by the elevator control unit 7. In particular, the elevator control unit 7 controls the speed of the elevator car by controlling the rotational speed of the motor 5 of the machinery M according to speed settings, which are preferably stored in a memory of the control unit 7. These speed settings define the constant target speed for the elevator car 1, i.e. the target speed which stays unchanged and is followed a substantial period of time. Thereby, the speed settings provide settings for the constant speed phase.

The control unit 7 controls the speed of the car 1 so that it follows the target speed 10 as far as possible. However, deviations from the intended speed behavior are possible, as above explained. In FIG. 2, unintended speed behavior starts at point Z during the constant speed phase when the speed should remain constant. At point X the unintended speed behavior is detected to be of such quantity and/or quality that it is likely that continuing the run with current speed settings would likely lead to exceeding of one or more safety limits for the speed of the car 1, exceeding of which safety limit(s) causes an unscheduled stopping of the car 1. The illustrated unintended speed behavior is typical when the passengers start to jump inside the car at point Z and the oscillation strengthens until at point X. This type of deviations from the intended speed do not directly cause or indicate falling of the car or braking of components, so they are uncritical in this sense. Uncritical deviations can be prevented from causing unscheduled stops by controlling the speed of the elevator car 1 moving vertically according to a method as disclosed herein. That is, the likelihood of exceeding safety limits is lowered by lowering the speed but still finishing the run as intended. More specifically, in the method, the speed of the elevator car 1 moving vertically is controlled during its run from the starting landing 2 to a destination landing 3 according to speed settings, the speed settings defining a constant target speed, for the elevator car I at least for the currently ongoing run. In the method a measurement data of the ongoing run is obtained, which measurement data describes vertical speed but possibly also vertical acceleration of the elevator car I moving currently vertically. In the method based on the measurement data it is determined whether the measurement data meets one or more predetermined criteria indicating at least unintended vertical speed but possibly also unintended vertical acceleration. If the measurement data meets said one or more predetermined criteria, then the speed settings of the current run are changed by lowering the constant target speed from a first constant target speed $C_1$ to a second constant target speed $C_2$ maintaining the destination landing 3 unchanged. If the one or more criteria is/are not met, at least the changing is omitted. This changing of speed settings takes place in FIG. 2 at point X where the predetermined one or more criteria is/are met. Thereby, deviations of uncritical nature can be prevented from causing an unscheduled stop for the car 1. The run is then continued without intermediate stops to said destination landing 3. After said changing of the settings, the speed of the car 1 is controlled according to the changed speed settings without changing the destination landing 3 from the original destination landing. The method reduces effectively the number of unscheduled stops. Nonetheless, the method does not weaken the safety of the elevator as the conventional safety systems and methods can be followed parallelly unaffected by the new method. For example, the normal overspeed limits can be provided for the elevator in conventional ways (such as with an overspeed governor, OSG), the method thereby forming an additional feature for the elevator, which reduces likelihood of exceeding overspeed limits in uncritical conditions. Accordingly, for providing a high level of safety, it is preferable that the elevator is provided with one or more safety limits L for the car speed, exceeding of which is arranged to cause unscheduled stopping of the car, such as for example immediate braking by car brakes gripping the guide rails of the elevator or immediate emergency braking sequence by machine brakes affecting the rotatable member 5. Said one or more safety limits preferably comprise at least a safety limit L which is constant for the whole run. This can be easily provided for the elevator for example by an over speed governor 11 of a known type, such as an over speed governor as disclosed in patent document EP0628510B1 or EP0662445B1. Said one or more safety limits may additionally or alternatively comprise a safety limit which is not constant for the whole run, but dependent on the car position, for example.

Preferably, if the measurement data meets said one or more predetermined criteria, the speed settings of the current run are changed by lowering the constant target speed 5-30%, preferably 10-25%. Thereby, the speed of the car 1 is lowered at a level from which a most meaningful portion of uncritical excitations is unable to cause a momentary peak in speed in such a way that a safety limit L is momentarily exceeded.

Preferably, the feature for reducing unnecessary unscheduled stops activates only if it is likely that otherwise an additional safety limit L would be exceeded. In other words, when the car is moving already with a slow constant speed, or when the constant speed is not reached, which may be the case e.g. with a run with only a short travel length, the feature for reducing unnecessary unscheduled stops does not activate. For this purpose, it is preferable that in the method the constant target speed is not changed if the constant target speed is lower than a predetermined speed, said predetermined speed being preferably the nominal speed of the elevator or a speed not less than 75% of the nominal speed of the elevator. Thereby, unnecessary activation of the feature is avoided. In these cases at least said changing is omitted but also said determining is preferably omitted too.

For the purpose of said determining said one or more predetermined criteria is/are stored in a memory or the control unit 7 or at least to be accessible by the control unit 7. Fulfillment of said one or more predetermined criteria is monitored by the control unit 7, for example by a processor comprised in the control unit 7, such a microprocessor or microprocessors. Implementing this type of monitoring is common general knowledge in the field of control technology in general, as well as in the field of elevator control, and in this case such commonly known control technology can be utilized for implementing the method, for example.

Said one or more predetermined criteria comprises at least that the deviation between the vertical speed of the car 1 and a speed of the motor 5 exceeds a predetermined limit. Abnormal situation can thus be detected early regardless of the speed or direction of travel of the car. Any kind of speed of the motor 5, which is comparable either as such or after processing (such as mathematical calculation or a after picking values from a table of predetermined values) with the vertical speed of the car, can be used. If any processing is required for making motor speed and the vertical speed of the car as described by the measurement data, comparable, then the method comprises a step wherein one or both of said motor speed and the measurement data describing the vertical speed of the car is/are further processed for making them comparable. Processing can be carried out by processor(s) comprised in the control unit 7 of the elevator. Preferably rpm of the motor 5 or circumferential speed of the motor 5 is used for said comparison.

In an example of a case of an elevator with 1:1 suspension, the circumferential speed of the motor 5 should be equal to the speed of the car 1 during a normal run and in case of n:1 suspension, the circumferential speed of the motor 5 should be equal to n times the speed of the car 1 during a normal run. For this purpose the circumferential speed of the motor 5 is measured. Then, the criterion is met by the measurement data if the deviation between this measured circumferential speed of the motor 5 and the car speed as described by the measurement data exceeds a predetermined limit. In this case, the speed settings of the current run are changed by lowering the constant target speed from a first constant target speed $C_1$ to a second constant target speed $C_2$. This example relates particularly to the typical case wherein the traction wheel 6 is an integral part of the rotor of the motor 5 the circumferential speed of the rotor surface thereby moving with same speed as ropes set against it.

On the other hand in an example when rpm of the motor 5 (i.e. rpm of the motor is said speed of motor) is used for the comparison with the measurement data describing the vertical speed of the vertically moving elevator car 1, then processing of one or both of these may be required for making motor speed and the vertical speed of the car as described by the measurement data, comparable. In that case, the method comprises a step wherein one or both of said motor speed, in particular data describing speed of the motor, and the measurement data describing the vertical speed of the vertically moving elevator car 1 is/are further processed for making them comparable. This processing can be carried out by processor(s) comprised in the control unit 7 of the elevator.

Said determining preferably comprises comparing the measurement data describing vertical speed of the vertically moving elevator car 1 with data, such as measurement data, describing speed of the motor. The method preferably further comprises obtaining said measurement data describing speed of the motor. So as to enable said determination, the measurement data describes vertical speed of the vertically moving elevator car 1, but it may additionally describe also vertical acceleration of the vertically moving elevator car 1.

Said one or more criteria may comprise solely said criterion related to deviation between the vertical speed of the car 1 and a speed of the motor 5. However, alternatively said one or more criteria may comprise one or more of the additional four criteria described in the following.

A criterion according to a first preferable additional criteria is that the vertical acceleration of the car 1, as described by the measurement data, exceeds a predetermined limit while the car 1 speed is being controlled according to a constant target speed, i.e. during a constant speed phase of the run. This provides a very simple way to detect a potentially harmful overspeed situation early and to react quickly so as to stop the car from reaching a speed, which would trigger an emergency braking or the like. Thus, for example, the elevator control can quickly react in case passengers start jumping in the car. Namely, a rhythmical jumping or a strong single jump could cause the car speed to exceed such a limit. Correspondingly, in this way to a vertical oscillation caused by any other excitation can be reacted quickly. Said acceleration of the car 1, as described by the measurement data, is preferably a momentary acceleration measured during the constant speed phase or an average acceleration calculated from several measurements measured during a short time of the constant speed phase. This criterion provides a very simple method when the measurement data describes vertical acceleration of the car as obtained from acceleration sensors mounted on the car. So as to enable said determination, in this alternative the measurement data describes also vertical acceleration of the vertically moving elevator car 1.

A criterion according to a second preferable additional criteria is that the vertical speed of the car 1, as described by the measurement data, exceeds a predetermined limit while the car 1 speed is being controlled according to a constant target speed, i.e. during a constant speed phase. In a corresponding manner as disclosed in the previous paragraph, this alternative can provide in an alternative way simple detection of a potentially harmful overspeed situation early and to react quickly so as to stop the car from reaching a speed, which would trigger an emergency braking or the like. This criterion provides a very simple method as measurement data describing the vertical speed of the car 1 would be advantageous to be obtained anyways for controlling the elevator.

A criterion according to a third preferable additional criteria is that the vertical acceleration of the car 1 alternates, while the car 1 speed is being controlled according to a constant target speed, i.e. during a constant speed phase. This provides in an alternative way simple detection of a potentially harmful overspeed situation early and to react quickly so as to stop the car from reaching a speed, which would trigger an emergency braking or the like. In this way, especially rhythmic jumping of passengers or any other rhythmic excitation can be observed and reacted to before it reaches a harmful scale. Preferably, the fulfillment of the criterion more precisely requires that the vertical acceleration of the car 1 alternates a cycle or plurality of cycles of increasing and decreasing acceleration. So as to enable said determination, in this alternative the measurement data describes also vertical acceleration of the vertically moving elevator car 1.

A criterion according to a fourth preferable additional criteria is that the vertical speed of the car 1 alternates, while the car 1 speed is being controlled according to a constant target speed, i.e. during a constant speed phase. This provides in an alternative way simple detection of a potentially harmful overspeed situation early and makes it possible to react quickly so as to stop the car from reaching a speed, which would trigger an emergency braking or the like. In this way, especially rhythmic jumping of passengers or any other rhythmic excitation can be observed and reacted to before it reaches a harmful scale. Preferably, the fulfillment of the criterion more precisely requires that the vertical speed of the car 1 alternates a cycle or plurality of cycles of increasing and decreasing speed.

Figure 3:
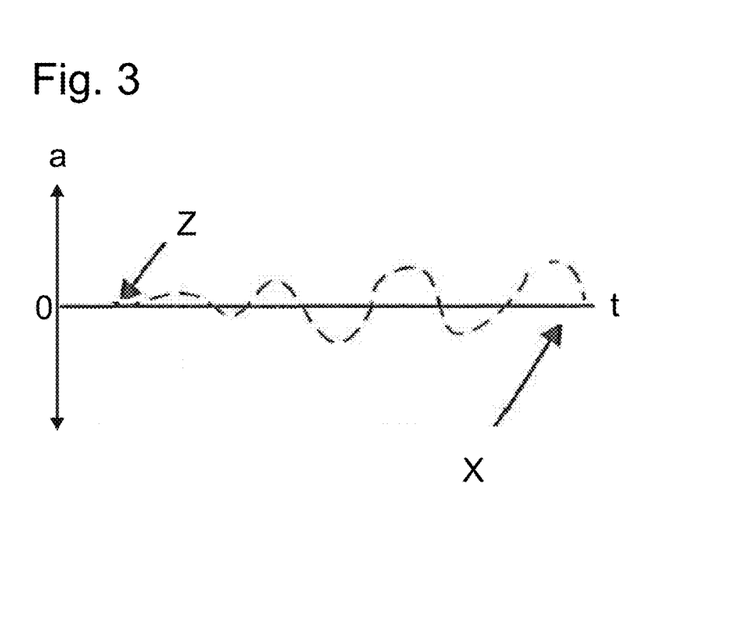
FIG. 3 illustrates the acceleration of the car relative to time or position during the constant speed phase of run illustrated in FIG. 2.

In the preferred embodiment said obtaining the measurement data of the ongoing run, which measurement data describes at least the vertical speed but possibly also vertical acceleration of the vertically moving elevator car 1 comprises generating measurement data describing vertical speed and possibly also vertical acceleration of the vertically moving elevator car 1. Preferably, said generating comprises measuring vertical speed and/or vertical acceleration of the vertically moving elevator car 1. In particular, it is preferable that the measuring is performed with an acceleration sensor 8 mounted on the elevator car 1, as illustrated in FIG. 1. Thus, the measurement is direct, whereby reliable and accurate measurements can be collected. The measurements can this way also be easily continuously collected, whereby the measurement data of the ongoing run can be kept continuously updated. FIG. 3 illustrates acceleration of the car 1 relative to time t during the constant speed phase of the run illustrated in FIG. 2. The changing of speed settings takes place in FIG. 3 at point X where the predetermined one or more criteria is/are met. The accurate position of point X, that is the moment in time when the one or more criteria is/are met, depends on which of the predetermined criteria is/are in use, and which of the criteria is first met in case several criteria are chosen to be used simultaneously. The accurate position of point X also depends on whether acceleration data is formed from momentary acceleration or an average. For these reasons, the position of point X should be interpreted as an example only.

As above explained, the criteria can include one or more criterion involving evaluating the acceleration or speed as described by the measurement data of the ongoing run. This measurement data, in case it describes acceleration, is obtainable simply, at best even without any processing of the measured vertical acceleration (measurement values), when the acceleration sensor 8 is used for generating said measurement data. On the other hand, this measurement data, in the alternative where it describes vertical speed instead of vertical acceleration, is obtainable also simply, when the acceleration sensor 8 is used for generating said measurement data, by processing the measured vertical acceleration, in particular by integrating the measured vertical acceleration so as to determine said vertical speed. Generally, the measurement data describing vertical speed is obtainable by using any sensor suitable for generating said measurement data, such as a car encoder.

The measurements collected from the elevator system can either as such form the measurement data or alternatively the measurement data can be obtained by processing the measurements collected from the elevator system. The measurement data is in any case in such a form that the measurement data is comparable with said one or more criteria by the control unit 7 during the aforementioned determining. In the latter case, for example, the processor(s) comprised in the control unit 7, such a microprocessor or microprocessors, can carry out this processing. The processing then includes converting of the measurements collected from the elevator system into measurement data which is comparable with said one or more criteria.

The elevator according to the invention implements the method as above described. As earlier described, the elevator is illustrated in FIG. 1 and comprises an elevator car 1, a roping 4 suspending the elevator car 1, a machinery M comprising a motor 5 connected to a rotatable drive member 6 engaging the roping 4. In this case the rotatable drive member 6 is a drive sheave rotated by an electric motor 5. The elevator further comprises a control unit 7 for control the speed of the elevator car 1 by controlling the rotational speed of the motor 5 of the machinery M, the control unit 7 being configured to control the speed of the vertically moving elevator car 1 during its run from a first landing 2 to a second landing 3 according to speed settings, the speed settings defining a constant target speed for the elevator car 1. The control unit is configured to obtain measurement data describing vertical speed and/or vertical acceleration of the vertically moving elevator car 1 (i.e. during vertical movement thereof), and to determine whether the measurement data meets one or more predetermined criteria indicating unintended vertical speed and/or unintended vertical acceleration, and if the measurement data meets said one or more predetermined criteria, to change the speed settings of the current run by lowering the constant target speed. The elevator comprises a measuring device for measuring the vertical speed and/or vertical acceleration of the vertically moving elevator car 1. The measuring device is in the preferred embodiment in the form of at least one acceleration sensor 8 mounted on the elevator car 1, as illustrated in FIG. 1. The control unit comprises an input i for a measurement signal s from the measuring device, in this case an acceleration sensor 8, which is measuring the vertical acceleration of the vertically moving elevator car 1.

Figure 4:
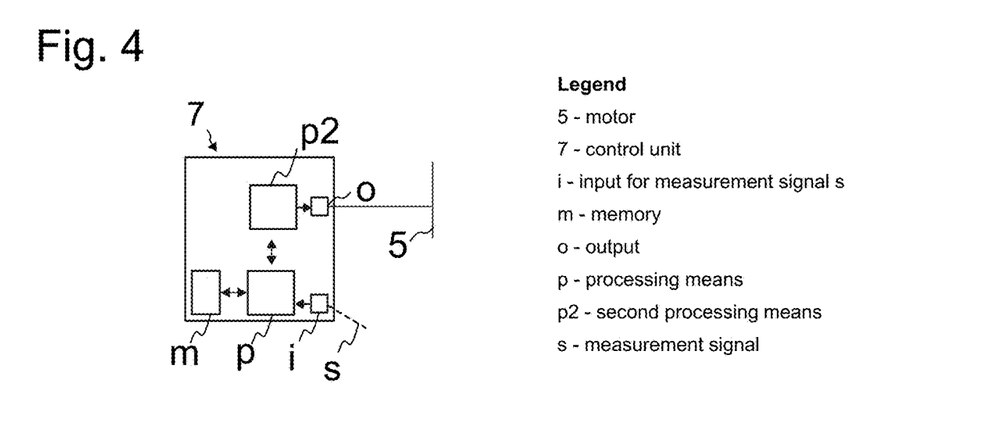
FIG. 4 the control unit according to a preferred embodiment.

The control unit 7 as well as the functions provided by it, such as carrying out the steps of the method described in this application, can be implemented in numerous known ways commonly known in the field of elevator control. FIG. 4 illustrates a simple design for the control unit 7. In particular, the control unit 7 comprises a memory m storing said criteria, and a processing means p, such as one or more microprocessors, in data transfer connection with the memory m and said input i, the processing means being configured to perform the aforementioned determining and changing of the speed settings. The control unit 7 further comprises an output o via which it controls the rotational speed of the motor 5 of the machinery and thereby the speed of the car 1. Said processing means p may be used also for the speed control of the rotational speed of the motor of the machinery and thereby the speed of the car 1, but alternatively the control unit comprises a second processing means p2, such as one or more microprocessor for this purpose (as illustrated in FIG. 4) which second processing means p2 is in data transfer connection with the earlier mentioned processing means p.

The measurement data preferably describes the speed and/or the acceleration numerically as a table or series of values. Thus, the measurement data is simply comparable with said one or more criteria.

In addition to said change of settings, it is preferable that a failure signal is sent to a center for monitoring failures of several elevators, such as to a service center for instance, if said one or more predetermined criteria is met. Also, a warning for elevator passengers may be represented on a display inside the elevator car.

In some embodiments, especially during a long elevator trip, the speed of elevator car will be returned to the original, higher constant speed level after the failure situation has terminated. This way it is possible to further reduce run time of elevator. It is to be understood that the above description and the accompanying Figures are only intended to illustrate the present invention. It will be apparent to a person skilled in the art that the inventive concept can be implemented in various ways. The invention and its embodiments are not limited to the examples described above but may vary within the scope of the claims.

The invention claimed is:

1. A method for controlling an elevator, the method comprising controlling the speed of a vertically moving elevator car during its run from a starting landing to a destination landing according to speed settings, the speed settings defining a constant target speed for the elevator car, wherein the method comprises the steps of:
generating measurement data of the ongoing run, which measurement data includes a vertical speed and an acceleration of the vertically moving elevator car while the elevator car is travelling at the constant target speed;
determining whether the measurement data of the vertical speed and the acceleration of the vertically moving elevator car meets predetermined criteria indicating unintended vertical speed and acceleration, said predetermined criteria comprising at least that the deviation between the vertical speed of the car and a speed of the motor exceeds a predetermined limit and a change in acceleration of the car exceeds a predetermined limit;
changing the speed settings of the current run by lowering the constant target speed from a first constant target speed to a second constant target speed if the measurement data meets said predetermined criteria;
determining when the elevator car no longer meets the predetermined criteria indicating unintended vertical speed and acceleration;
increasing the constant target speed from the second constant target speed to the first constant target speed; and
continuing the run without intermediate stops to said destination landing.

2. The method according to claim 1, wherein if the measurement data meets said predetermined criteria, the speed settings of the current run are changed by lowering the constant target speed 5-30%.

3. The method according to claim 1, wherein the original destination landing of the run is maintained the same.

4. The method according to claim 1, wherein at least said changing is omitted if the constant target speed is lower than a predetermined speed, said predetermined speed being the nominal speed of the elevator or a speed not less than 75% of the nominal speed.

5. The method according claim 1, wherein said generating comprises measuring the vertical acceleration of the vertically moving elevator car with an acceleration sensor mounted on the elevator car.

6. The method according to claim 1, wherein said generating comprises measuring the vertical acceleration of the currently vertically moving elevator car and integrating said measured vertical acceleration so as to determine said vertical speed.

7. An elevator, comprising:
an elevator car;
a roping suspending the elevator car;
a machinery comprising a motor connected to a rotatable drive member engaging the roping; and
a control unit for controlling the speed of the elevator car by controlling the rotational speed of the motor of the machinery, the control unit being configured to control the speed of the vertically moving elevator car during its run from a first landing to a second landing according to speed settings, the speed settings defining a constant target speed for the elevator car,
wherein the control unit is configured to:
generate measurement data of the ongoing run, which measurement data includes a vertical speed and an acceleration of the vertically moving elevator car while the elevator car is travelling at the constant target speed,
determine whether the measurement data of the vertical speed and the acceleration of the vertically moving elevator car meets predetermined criteria indicating unintended vertical speed and acceleration, said predetermined criteria comprising at least that the deviation between the vertical speed of the car and a speed of the motor exceeds a predetermined limit and a change in acceleration of the car exceeds a predetermined limit, if the measurement data meets said predetermined criteria, change the speed settings of the current run by lowering the constant target speed from a first constant target speed to a second constant target speed, determine when the elevator car no longer meets the predetermined criteria indicating unintended vertical speed and acceleration, increase the constant target speed from the second constant target speed to the first constant target speed, and continue the run without intermediate stops to said destination landing.

8. The elevator according to claim 7, wherein the control unit comprises an input for a signal from a measuring device measuring the vertical speed and vertical acceleration of the vertically moving elevator car, and in that the control unit comprises a memory storing said criteria, and in that the control unit comprises a processor in data transfer connection with the memory and said input, configured to perform the determining and changing of the speed settings.

9. The elevator according to claim 7, wherein the elevator is additionally provided with an arrangement defining one or more safety limits for the speed of the car, exceeding of which one or more limits is configured to cause unscheduled stopping of the car.

10. The elevator according to claim 9, wherein said one or more safety limits comprise at least a safety limit which is constant for the whole run.

11. The method according to claim 2, wherein the original destination landing of the run is maintained the same.

12. The method according to claim 2, wherein at least said changing is omitted if the constant target speed is lower than a predetermined speed, said predetermined speed being the nominal speed of the elevator or a speed not less than 75% of the nominal speed.

13. The method according to claim 3, wherein at least said changing is omitted if the constant target speed is lower than a predetermined speed, said predetermined speed being the nominal speed of the elevator or a speed not less than 75% of the nominal speed.

* * * * *